United States Patent
Morise et al.

(10) Patent No.: US 8,851,261 B2
(45) Date of Patent: Oct. 7, 2014

(54) HYDRAULIC CONTROL DEVICE FOR VEHICULAR FRICTION CLUTCH

(75) Inventors: Masaru Morise, Nukata-gun (JP);
Atsuhisa Mizuta, Toyota (JP);
Masanobu Yamada, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 246 days.

(21) Appl. No.: 13/505,141

(22) PCT Filed: Oct. 30, 2009

(86) PCT No.: PCT/JP2009/068693
§ 371 (c)(1),
(2), (4) Date: Apr. 30, 2012

(87) PCT Pub. No.: WO2011/052072
PCT Pub. Date: May 5, 2011

(65) Prior Publication Data
US 2012/0211325 A1    Aug. 23, 2012

(51) Int. Cl.
*F16D 48/02* (2006.01)
*F16D 25/08* (2006.01)

(52) U.S. Cl.
CPC ............ *F16D 48/02* (2013.01); *F16D 25/083* (2013.01); *F16D 2048/0221* (2013.01)
USPC .................... 192/85.63; 192/85.57

(58) Field of Classification Search
CPC ............ F16D 2048/0293; F16D 2500/1027
See application file for complete search history.

(56) References Cited

U.S. PATENT DOCUMENTS

| | | | |
|---|---|---|---|
| 6,162,147 A * | 12/2000 | Moorman | 192/85.63 |
| 6,860,293 B2 * | 3/2005 | Douglass et al. | 137/596.17 |
| 2009/0301588 A1 * | 12/2009 | Shimizu et al. | 137/625.64 |

FOREIGN PATENT DOCUMENTS

| | | |
|---|---|---|
| JP | 63 297852 | 12/1988 |
| JP | 1 76816 | 7/1989 |
| JP | 7 127664 | 5/1995 |
| JP | 9 206992 | 8/1997 |
| JP | 2000 85413 | 3/2000 |
| JP | 2002 340031 | 11/2002 |
| JP | 2008 190718 | 8/2008 |
| JP | 2009 30710 | 2/2009 |

OTHER PUBLICATIONS

International Search Report Issued Jan. 19, 2010 in PCT/JP09/68693 Filed Oct. 30, 2009.

\* cited by examiner

*Primary Examiner* — Rodney H Bonck
(74) *Attorney, Agent, or Firm* — Oblon, Spivak, McClelland, Maier & Neustadt, L.L.P.

(57) ABSTRACT

Providing a hydraulic control device for a friction clutch for a vehicle, which permits the vehicular friction clutch to have an improved response of its releasing action. The hydraulic control device includes a braking valve provided in an oil passage through which a working oil is discharged from a clutch cylinder to place the friction clutch in its engaged state, and the braking valve permits the working oil to be discharged from the clutch cylinder when a pressure acting on an end portion of the braking valve on the side of the clutch cylinder has exceeded a predetermined clutch releasing pressure value, so that a discharge flow of the working oil from a pressure chamber of the clutch cylinder is restricted due to the braking valve even when the pressure in the pressure chamber is reduced below the atmospheric pressure value, whereby it is possible to prevent an increase of a gap formed between a pair of pistons of the clutch cylinder, permitting an improvement of a response of the releasing action of the friction clutch.

5 Claims, 11 Drawing Sheets

HYDRAULIC CONTROL DEVICE FOR VEHICULAR FRICTION CLUTCH

TECHNICAL FIELD

The present invention relates to a hydraulic control device for a friction clutch for a vehicle, and more particularly to techniques for improving a response of a releasing action of the vehicular friction clutch.

BACKGROUND ART

There is known a hydraulic control device for a vehicular friction clutch provided with a hydraulic cylinder having a piston assembly consisting of pistons arranged in its axial direction. The hydraulic control device for such a vehicular friction clutch is configured such that a minute gap formed between a pair of pistons of the friction clutch makes it possible to prevent a vibration of a vehicular drive power source such as an engine transmitted to one of the pair of pistons, from being transmitted to the other of the pair of pistons is restricted. Accordingly, it is possible to reduce the transmission of the vibration to a sealing member provided between the pistons and a pressure chamber of the hydraulic cylinder to oil-tightly seal the pressure chamber, so that the durability of the seating member is improved. Patent Document 1 discloses a hydraulic control device wherein a flow restrictor (orifice) is provided between a pressure chamber of a hydraulic cylinder and a control oil passage through which a working oil is supplied to the pressure chamber.

PRIOR ART DOCUMENT

Patent Document

Patent Document 1: JP-2008-190718 A

SUMMARY OF THE INVENTION

Object Achieved By The Invention

In the above-described conventional hydraulic control device for the vehicular friction clutch, the pressure in the pressure chamber of the above-described hydraulic cylinder is reduced below the atmospheric pressure value due to, for example, an inertia of the working oil discharged from the hydraulic cylinder, or acceleration of the working oil caused by a behavior of the vehicle. The inertia of the working oil discharged from the above-described hydraulic cylinder means the inertia of the working oil flowing from the above-described pressure chamber of the hydraulic cylinder toward an oil passage communicating with the pressure chamber while the working oil is discharged from the pressure chamber through the oil passage to bring the friction clutch into its released state. The acceleration of the working oil caused by the behavior of the vehicle means the acceleration of the working oil within the pressure chamber of the hydraulic cylinder and the oil passage communicating with the pressure chamber, while the working oil is flowing from the above-described pressure chamber toward the above-described oil passage due to longitudinal or transverse acceleration of the vehicle in a running state of the vehicle. Accordingly, one of the pair of pistons arranged in the axial direction, that is, the pressure-chamber-side piston disposed on the side of the pressure chamber may be moved in the direction away from the other piston, that is, the output-side piston which outputs a clutch operating force acting on the friction clutch. An amount of the minute gap provided between the above-described pair of pistons may be comparatively larger than an optimum value necessary and sufficient to reduce the transmission of the above-indicated vibration. In this case, there is a problem that the hydraulic pressure in the pressure chamber of the hydraulic cylinder will not be raised to place the friction clutch in its released state, so that a releasing action of the friction clutch will not be initiated, until the comparatively large gap is eliminated. Thus, the response of the releasing action of the vehicular friction clutch may be reduced in the prior art.

The present invention was made in view of the background art described above. It is therefore an object of the present invention to provide a hydraulic control device for a friction clutch for a vehicle, which permits the vehicular friction clutch to have an improved response of its releasing action.

Means For Achieving The Object

The object indicated above is achieved according to the first aspect of the invention, which provides a hydraulic control device (a) for a friction clutch for a vehicle, which is operated by a hydraulic cylinder having pistons arranged in an axial direction thereof, characterized by comprising (b) a braking valve provided in an oil passage through which a working oil is discharged from the above-described hydraulic cylinder to place the above-described friction clutch in its engaged state, the braking valve permitting the working oil to be discharged from the above-described hydraulic cylinder when a pressure acting on an end portion of the above-described braking valve on the side of the above-described hydraulic cylinder has exceeded a predetermined clutch releasing pressure value.

According to the second aspect of the invention, the clutch releasing pressure value described above with respect to the first aspect of the invention is higher than the pressure acting on the end portion of the above-described braking valve on the side of the above-described hydraulic cylinder when the pressure in the above-described hydraulic cylinder is reduced below an atmospheric pressure value due to an inertia of the working oil discharged from the above-described hydraulic cylinder or due to acceleration of the working oil caused by a behavior of the above-described vehicle.

According to the third aspect of the invention, the hydraulic control device described above with respect to the first or second aspect of the invention further comprises a flow control valve configured to supply the working oil from a hydraulic pressure source to the above-described hydraulic cylinder for placing the above-described friction clutch in its released state, and to discharge the working oil from the above-described hydraulic cylinder for placing the above-described friction clutch in its engaged state.

According to the fourth aspect of the invention, (a) the braking valve described above with respect to the third aspect of the invention is provided in a control oil passage connecting the above-described flow control valve and the above-described hydraulic cylinder, and (b) the hydraulic control device further comprises a one-way valve which is provided in the above-described control oil passage, in parallel with the above-described braking valve and which permits a flow of the working oil in a direction from the above-described flow control valve toward the above-described hydraulic cylinder and inhibits a flow of the working oil in a direction from the above-described hydraulic cylinder toward the above-described flow control valve.

According to the fifth aspect of the invention, the braking valve described above with respect to the third aspect of the invention is provided in a drain oil passage through which the working oil is discharged from the above-described flow control valve.

According to the sixth aspect of the invention, the hydraulic control device according to the fourth aspect of the invention further comprises a flow restrictor disposed in parallel with the above-described braking valve.

According to the seventh aspect of the invention, the hydraulic control device described above with respect to the fourth aspect of the invention includes a composite valve device provided with: a cylindrical valve member which is accommodated in a cylindrical valve chamber provided in the above-described control oil passage, such that the cylindrical valve member is movable in an axial direction with a predetermined gap left with respect to an inner circumferential surface of the above-described valve chamber, and such that the cylindrical valve member can be seated on and unseated from a first seating surface formed at an end of the above-described valve chamber on the side of the above-described hydraulic cylinder; a spring biasing the above-described cylindrical valve member in a direction toward the above-described first seating surface with a predetermined biasing force, to set the above-described predetermined clutch releasing pressure value; and a small valve member accommodated in the above-described cylindrical valve member such that the small valve member can be seated on and unseated from a second seating surface formed at a position within the above-described cylindrical valve member remote from the above-described hydraulic cylinder, and wherein the above-described composite valve device functions as the above-described braking valve and the above-described one-way valve.

According to the eighth aspect of the invention, the hydraulic control device described above with respect to the sixth aspect of the invention includes a composite valve device provided with: a cylindrical valve member which is accommodated in a cylindrical valve chamber provided in the above-described control oil passage, such that the cylindrical valve member is movable in an axial direction with a predetermined gap left with respect to an inner circumferential surface of the above-described valve chamber, and such that the cylindrical valve member can be seated on and unseated from a first seating surface formed at an end of the above-described valve chamber on the side of the above-described hydraulic cylinder; a spring biasing the above-described cylindrical valve member in a direction toward the above-described first seating surface with a predetermined biasing force, to set the above-described predetermined clutch releasing pressure value; a small valve member accommodated in the above-described cylindrical valve member such that the small valve member can be seated on and unseated from a second seating surface formed at a position within the above-described cylindrical valve member remote from the above-described hydraulic cylinder; and a flow restricting hole which is formed through a circumferential wall of the above-described cylindrical valve member and which permits restricted flows of the working oil therethrough to and from the above-described cylindrical valve chamber even when the above-described cylindrical valve member is seated on the above-described first seating surface while the above-described small valve member is seated on the above-described second seating surface, and wherein the above-described composite valve device functions as the above-described braking valve, the flow restrictor and the above-described one-way valve.

According to the first aspect of this invention, the hydraulic control device for the friction clutch for the vehicle includes the braking valve which is provided in the oil passage through which the working oil is discharged from the above-described hydraulic cylinder to place the above-described friction clutch in its engaged state and which permits the working oil to be discharged from the above-described hydraulic cylinder when the pressure acting on the end portion of the above-described braking valve on the side of the above-described hydraulic cylinder has exceeded the predetermined clutch releasing pressure value. Accordingly, even when the pressure in a pressure chamber of the hydraulic cylinder is reduced below the atmospheric pressure value due to the inertia of the working oil discharged from the hydraulic cylinder or due to the acceleration of the working oil caused by the behavior of the vehicle, the discharge flow of the working oil from the pressure chamber and the oil passage between the pressure chamber and the braking valve is restricted by the braking valve, making it possible to prevent an increase of a gap formed between a pair of pistons of the hydraulic cylinder, which increase would otherwise be caused by the reduction of the pressure in the above-described pressure chamber below the atmospheric pressure value. As a result, a rise of the pressure in the pressure chamber of the hydraulic cylinder by a supply flow of the working oil into the pressure chamber to place the friction clutch in its released state can be initiated at an earlier point of time, so that the response of the releasing action of the friction clutch can be improved.

In the hydraulic control device according to the second aspect of the invention for the friction clutch for the vehicle, the above-described clutch releasing pressure value is higher than the pressure acting on the end portion of the above-described braking valve on the side of the above-described hydraulic cylinder when the pressure in the above-described hydraulic cylinder is reduced below an atmospheric pressure value due to an inertia of the working oil discharged from the above-described hydraulic cylinder or due to acceleration of the working oil caused by a behavior of the above-described vehicle. Accordingly, the braking valve is not opened by a force acting on the end portion of the braking valve on the side of the hydraulic cylinder as a result of generation of the above-indicated reduced pressure below the atmospheric pressure value, making it possible to prevent an increase of the gap between the pair of pistons of the hydraulic cylinder, which increase would otherwise be caused by the generation of the above-indicated reduced pressure. As a result, the rise of the pressure in the pressure chamber of the hydraulic cylinder by the supply flow of the working oil into the hydraulic cylinder to place the friction clutch in its released state can be initiated at an earlier point of time, so that the response of the releasing action of the friction clutch can be improved.

The hydraulic control device according to the third aspect of the invention for the friction clutch for the vehicle further comprises a flow control valve configured to supply the working oil from a hydraulic pressure source to the above-described hydraulic cylinder for placing the above-described friction clutch in its released state, and to discharge the working oil from the above-described hydraulic cylinder for placing the above-described friction clutch in its engaged state. Accordingly, the operation of the friction clutch can be controlled by mechanically or electrically controlling the above-described flow control valve.

The hydraulic control device according to the fourth aspect of the invention for the friction clutch for the vehicle is configured such that the above-described braking valve is provided in a control oil passage connecting the above-described flow control valve and the above-described hydraulic cylinder, and further comprises a one-way valve which is provided in the above-described control oil passage, in parallel with the above-described braking valve and which permits a flow of the working oil in a direction from the above-described flow control valve toward the above-described hydraulic cylinder and inhibits a flow of the working oil in a direction from the above-described hydraulic cylinder toward the above-described flow control valve. Since the braking valve is provided in the control oil passage in the hydraulic control device, which is nearer to the hydraulic cylinder, it is possible to more effectively reduce the degree of reduction of the pressure in the hydraulic cylinder below the atmospheric pressure value, and accordingly prevent disturbance of a supply flow of the working oil into the hydraulic cylinder to place the friction clutch in its released state, while assuring an advantage of preventing an increase of the gap formed between the pair of pistons of the hydraulic cylinder, which increase would otherwise be caused by the reduction of the pressure in the pressure chamber below the atmospheric pressure value. Thus, the response of the releasing action of the friction clutch can be further improved. Even where there is a high possibility of a stall of the engine, for instance, upon releasing of the friction clutch, the stall of the engine can be prevented owing to an earlier releasing action of the friction clutch.

In the hydraulic control device according to the fifth aspect of the invention for the friction clutch for the vehicle, the above-described braking valve is provided in a drain oil passage through which the working oil is discharged from the above-described flow control valve. Accordingly, the braking valve does not disturb a supply flow of the working oil into the hydraulic cylinder to place the friction clutch in its released state, so that the response of the releasing action of the friction clutch can be further improved. Even where there is a high possibility of a stall of the engine, for instance, upon releasing of the friction clutch, the stall of the engine can be prevented owing to an earlier releasing action of the friction clutch.

According to the sixth aspect of the invention, the hydraulic control device for the friction clutch for the vehicle further comprises the flow restrictor disposed in parallel with the above-described braking valve. Accordingly, the working oil can be discharged from the hydraulic cylinder through the flow restrictor, to an extent that permits a minute gap to be formed between a pair of pistons of the hydraulic cylinder, even when the braking valve is not opened. Therefore, it is possible to prevent transmission of a vibration of a vehicle drive power source such as an engine to a sealing member oil-tightly sealing the pressure chamber of the hydraulic cylinder, through the pair of pistons of the hydraulic cylinder, so that the durability of the sealing member can be improved.

The hydraulic control device according to the seventh aspect of the invention for the friction clutch for the vehicle has a composite valve device which is integrally provided with portions corresponding to the above-descried braking valve and the above-described one-way valve and which functions as the braking valve and one-way valve. Accordingly, the braking valve and the one-way valve can be made small-sized, and the length of the oil passage provided with these elements can be shortened.

The hydraulic control device according to the eighth aspect of the invention for the friction clutch for the vehicle has a composite valve device which is integrally provided with portions corresponding to the above-descried braking valve, the above-described flow restrictor and the above-described one-way valve and which functions as the braking valve, flow restrictor and one-way valve. Accordingly, the braking valve, the flow restrictor and the one-way valve can be made small-sized, and the length of the oil passage provided with these elements can be shortened.

Preferably, the above-described braking valve is located as close as possible to the pressure chamber of the hydraulic cylinder. For instance, the braking valve is located between the pressure chamber of the hydraulic cylinder and an oil pipe through which the working oil is supplied to the pressure chamber. In this instance, it is possible to more effectively reduce the degree of reduction of the pressure in the pressure chamber of the hydraulic cylinder due to the inertia of the working oil discharged from the hydraulic cylinder or due to acceleration of the working oil caused by a behavior of the vehicle, and to accordingly prevent an increase of the gap formed between the pair of pistons of the hydraulic cylinder, which increase would otherwise be caused by the reduction of the pressure in the above-described pressure chamber below the atmospheric pressure value.

Preferably, the above-described composite valve device is provided with a spring for biasing the above-described small valve member toward the second seating surface with a predetermined biasing force. In this case, the small valve member is operable with a higher degree of stability than a small valve member which is configured to be seated by gravity on the second seating surface, and the composite valve device can be more easily installed. For example, it is possible to prevent an unstable operation of the one-way valve due to a movement of the small valve member by a vibration. Further, the composite valve device can be installed such that the small valve member is located below the second seating surface, for example.

In the present specification, the expression "provided in parallel with" is interpreted to mean connection of two members to each other at their end portions. Accordingly, the expression "the braking valve and the flow restrictor provided in parallel with each other" is interpreted to mean mutual connection of the ports of the braking valve and flow restrictor on the side of the hydraulic cylinder, and mutual connection of their ports on the side remote from the hydraulic cylinder, while the expression "the braking valve and the one-way valve provided in parallel with each other" is interpreted to mean mutual connection of the ports of the braking valve and one-way valve on the side of the hydraulic cylinder, and mutual connection of their ports on the side remote from the hydraulic cylinder.

MODE FOR CARRYING OUT THE INVENTION

Embodiments of the present invention will be described in detail by reference to the drawings. It is to be understood that the drawings showing the embodiments are simplified or transformed as needed, and do not necessarily accurately indicate the dimensions and shapes of individual elements of the embodiments.

Embodiment 1

Figure 1:
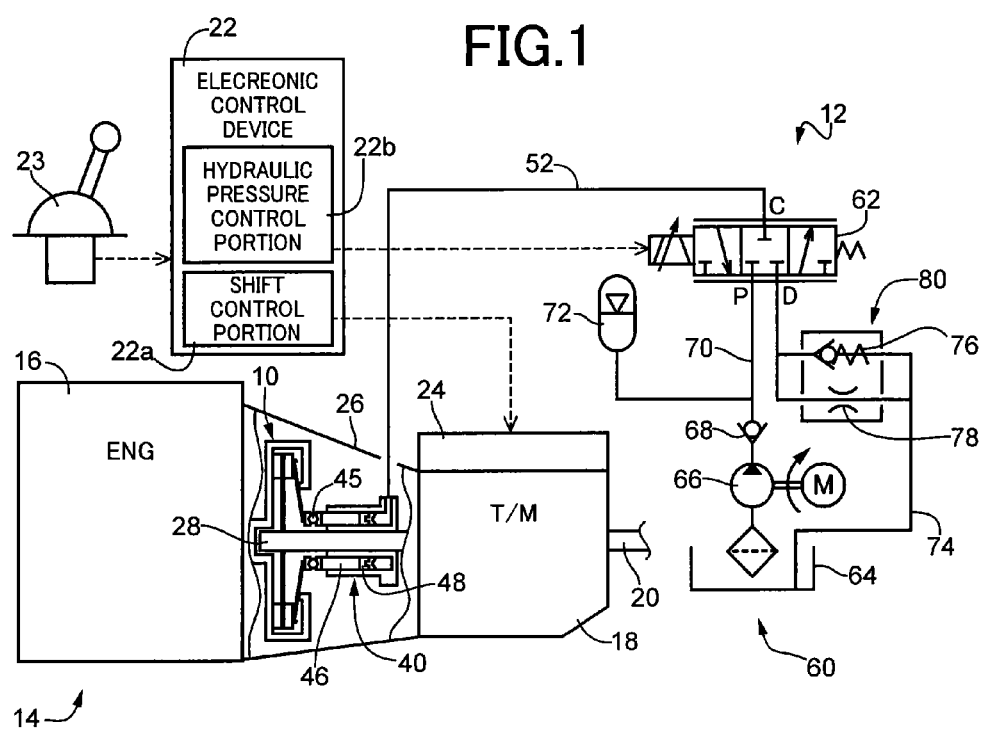
FIG. 1 is a schematic view showing a hydraulic control device according to one embodiment of this invention for a vehicular friction clutch, and a vehicular drive system provided with the hydraulic control device.

FIG. 1 is the schematic view showing a hydraulic control device 12 according to one embodiment of this invention for a vehicular friction clutch (hereinafter referred to as "friction clutch") 10, and a vehicular drive system (hereinafter referred to as "drive system") 14 provided with the hydraulic control device 12. As shown in FIG. 1, the drive system 14 is constructed such that an output of a drive power source in the form of an engine 16 is transmitted to a transmission 18 through the friction clutch 10, and transmitted from an output shaft 20 of the transmission 18 to a pair of right and left drive wheels through a propeller shaft and a differential gear device not shown. The drive system 14 in the present embodiment is suitably used for a vehicle of a front-engine rear-drive (FR) type.

The transmission 18 is a step-variable transmission having a power transmission mechanism of a parallel-axes permanent meshing type, for instance, and is shifted by a shift actuator 24 operated under the control of a shift control portion 22a of an electronic control device 22. A shifting operation of the transmission 18 is performed on the basis of a shift commanding signal generated from a shift commanding device 23 manually operated by an operator of the vehicle, for example.

The electronic control device 22 described above includes a plurality of so-called microcomputers each incorporating a CPU, a ROM, a RAM and an input-output interface, and is configured to perform signal processing operations according to control programs stored in the ROM, while utilizing a temporary data storage function of the RAM, for implementing a drive control of the shift actuator 24, a drive control of a flow control valve 62 described below, and other controls. The electronic control device 22 in this embodiment is provided with the shift control portion 22a for controlling the shift actuator 24 to shift the transmission 18, and a hydraulic pressure control portion 22b for controlling a flow control valve 62 to control a flow of a working oil supplied to a clutch cylinder 40 described below, and a flow of the working oil discharged from the clutch cylinder 40.

Figure 2:
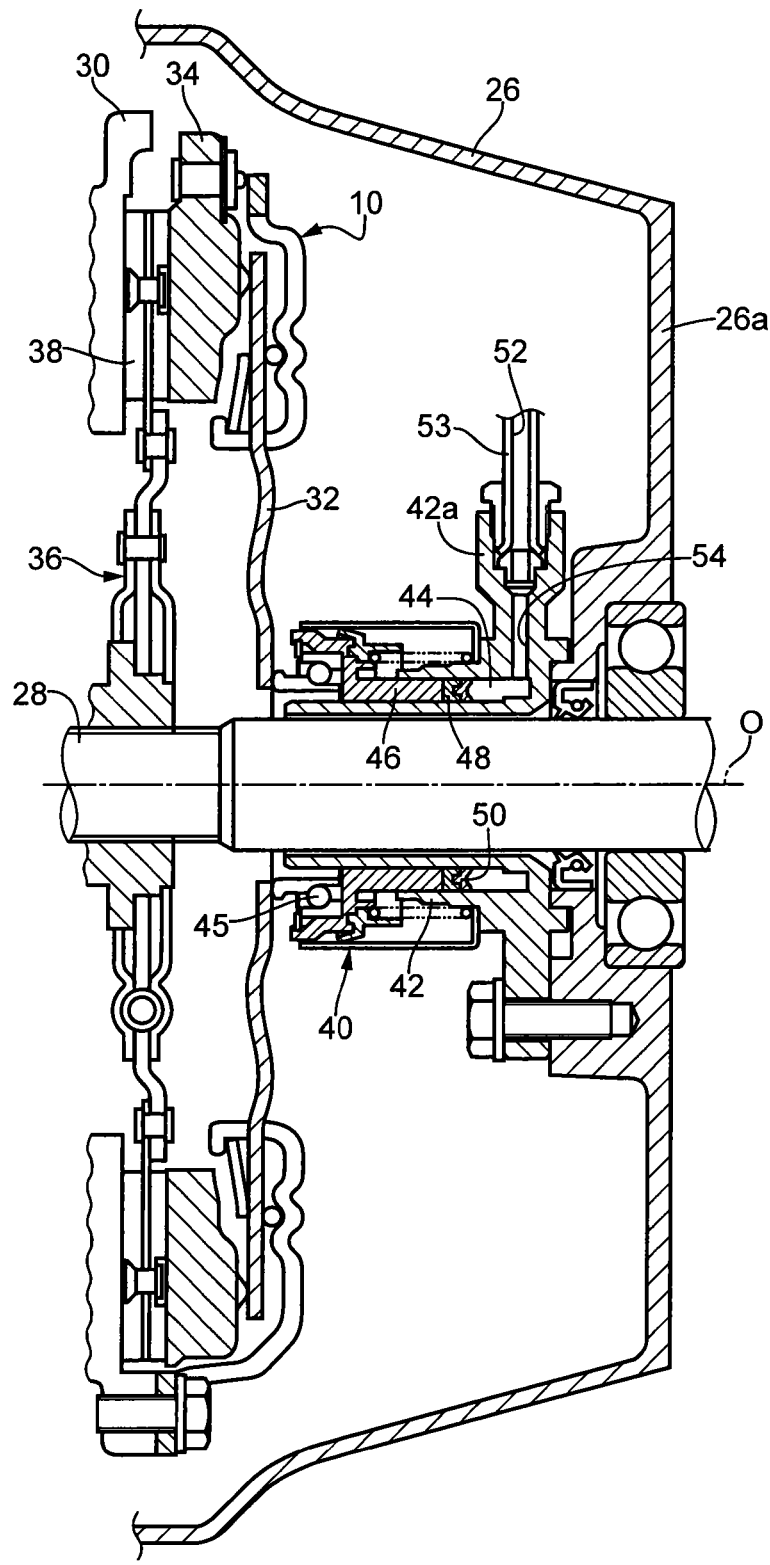
FIG. 2 is a cross sectional view showing the vehicular friction clutch shown in FIG. 1, and its peripheral portions.

FIG. 2 is the cross sectional view showing the vehicular above-described friction clutch 10, and its peripheral portions. As shown in FIG. 2, the friction clutch 10 is a vehicular disc clutch well known in the art, and is disposed within a cylindrical clutch housing 26, and in a portion of a power transmitting path between a fly wheel 30 connected to a crankshaft not shown, and an input shaft 28 of the transmission 18. When a operating force of the clutch cylinder 40 described below, namely, a clutch operating force does not act on a radially inner portion of a diaphragm spring 32 of the friction clutch 10, a pressure plate 34 is pressed by a radially outer portion of the diaphragm spring 32 toward the fly wheel 30, so that a clutch disc 36 is squeezed between the pressure plate 34 and the fly wheel 30, whereby the clutch disc 36 and the fly wheel 30 are placed in full engagement with each other through a friction member 38. Thus, the friction clutch 10 is placed in a power transmitting state. The friction clutch 10 in this power transmitting state is shown in FIG. 2. When the operating force of the clutch cylinder 40, namely, the clutch operating force acts on the radially inner portion of the diaphragm spring 32 in the direction toward the engine 16, a pressing force of the pressure plate 34 acting on the clutch disc 36 varies according to the clutch operating force, and the operating state of the clutch disc 36 and the fly wheel 30 varies between a partially engaged state and a fully released state. When the pressing force of the pressure plate 34 acting on the clutch disc 36 is fully removed, the clutch disc 36 and the fly wheel 30 are placed in the fully released state, whereby the friction clutch 10 is placed in a power cut-off state.

A hydraulic cylinder in the form of the clutch cylinder 40 is disposed on one side of the radially inner portion of the diaphragm spring 32, which is nearer to the transmission 18. This clutch cylinder 40, which is of a so-called "coaxial type" well known in the art, is disposed coaxially with the input shaft 28, and has a cylindrical cylinder housing 42 disposed radially outwardly of the input shaft 28 and fixed to a central portion of a partition wall 26a of the clutch housing 26, which is located adjacent to one end of the transmission 18. The clutch cylinder 40 has an annular pressure chamber 44 which is formed within the cylinder housing 42 and radially outwardly of the input shaft 28 and which receives the working oil from the hydraulic control device 12; an annular output-side piston 46 slidably accommodated within the cylinder housing 42 and operated to apply the clutch operating force to the friction clutch 10 through a release bearing 45; an annular pressure-chamber-side piston 48 which is disposed on one side of the output-side piston 46 nearer to the pressure chamber 44, movably relative to the output-side piston 46, and which is operated by a clutch operating hydraulic pressure in the pressure chamber 44, to apply a thrust force to the output-side piston 46; and a sealing member 50 disposed on the side of the pressure-chamber-side piston 48 nearer to the pressure chamber 44, to oil-tightly seal the pressure chamber 44. It will be understood that the above-described output-side piston 46 and pressure-chamber-side piston 48 correspond to pistons arranged in a direction of an axis O.

The above-described cylinder housing 42 is connected to a metallic conduit 53 which extends radially outwardly on outer periphery side of the pressure chamber 44 and which has a control oil passage 52 of the hydraulic control device 12, and is provided with a joint portion 42a which has a communication hole 54 for communication between the control oil passage 52 and the pressure chamber 44.

In this clutch cylinder 40, the output-side piston 46 is moved toward or away from the radially inner portion of the diaphragm spring 32, according to the clutch operating hydraulic pressure which is increased or reduced depending upon whether the working oil is supplied from the hydraulic control device 12 to the pressure chamber 44 or discharged from the pressure chamber 44, whereby the clutch operating force corresponding to the clutch operating hydraulic pressure in the pressure chamber 44 is applied from the output-side piston 46 to the radially inner portion of the diaphragm spring 32. The friction clutch 10 is operated by the clutch cylinder 40.

It is noted that the clutch cylinder 40 in the present embodiment has a piston assembly consisting of the output-side piston 46 and the pressure-chamber-side piston 48 which are arranged in the direction of the axis O and which are movable relative to each other. When the output-side piston 46 is located at a position corresponding to the fully engaged state of the friction clutch 10, a minute gap formed between the output-side piston 46 and the pressure-chamber-side piston 48 makes it possible to prevent a vibration of the engine 16 transmitted to the output-side piston 46 through the friction clutch 10, from being transmitted to the pressure-chamber-side piston 48 and the sealing member 50.

Referring back to FIG. 1, the hydraulic control device 12 is provided with: a hydraulic pressure source 60; a flow control valve 62 for supplying the working oil from the hydraulic pressure source 60 to the pressure chamber 44 of the clutch cylinder 40 to place the friction clutch 10 in its released state and for discharging the working oil from the pressure chamber 44 of the clutch cylinder 40 to place the friction clutch 10 in its engaged state; and the hydraulic pressure control portion 22b of the electronic control device 22.

The above-described hydraulic pressure source 60 is provided with an electrically operated oil pump 66 to pressurize the working oil received from the oil reservoir 64 and deliver the pressurized working oil, and an accumulator 72 connected to a delivery oil passage 70 connected through a check valve 68 to a delivery port of the oil pump 66.

The above-described flow control valve 62 is provided with a pump port P connected to the delivery oil passage 70, a control port C connected to the control oil passage 52, and a drain port D connected to a drain oil passage 74. The flow control valve 62 is switchable between its state for permitting a flow of the working oil from the pump port P to the control port C and its state for permitting a flow of the working oil from the control port C to the drain port D, and is operable to continuously control rates of the flows of the working oil, according to an amount of an electric current applied to the flow control valve 62. The above-described control oil passage 52 is an oil passage for connecting the pressure chamber 44 of the clutch cylinder 40 and the flow control valve 62.

The drain oil passage 74 is an oil passage through which the working oil is discharged from the flow control valve 62 to the oil reservoir 64. This drain oil passage 74 is provided with a braking valve 76 for permitting the working oil to be discharged from the clutch cylinder 40 to the oil reservoir 64 when the pressure in the clutch cylinder 40 has exceeded a predetermined clutch releasing pressure value (clacking pressure), and a flow restrictor 78 disposed in parallel with the braking valve 76. It will be understood that the drain oil passage 74 corresponds to an oil passage through which the working oil is discharged from the clutch cylinder (hydraulic cylinder) 40 for placing the friction clutch 10 in its engaged state. The hydraulic control device 12 according to the present embodiment is provided with a composite valve device 80 which functions as the above-described braking valve 76 and flow restrictor 78.

Figure 3:
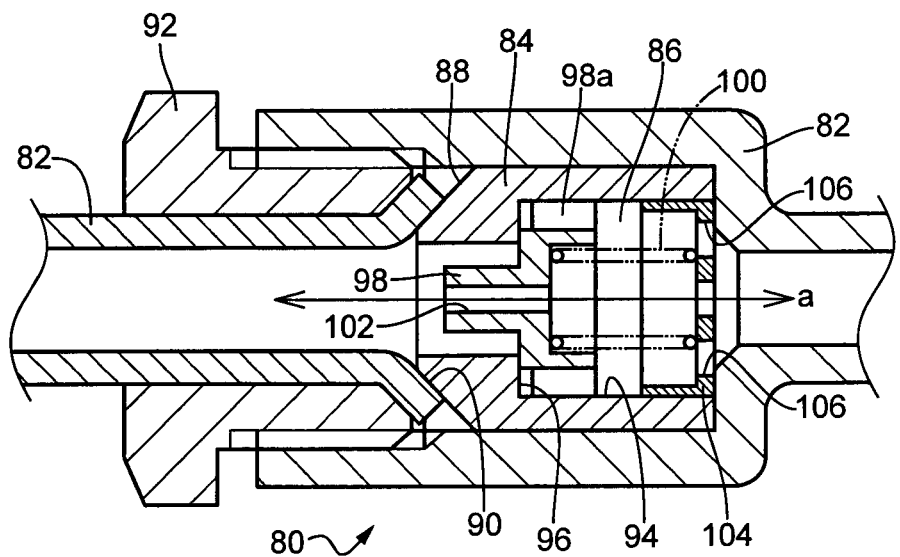
FIG. 3 is a cross sectional view showing in detail an example of a composite valve device integrally provided with a braking valve and a flow restrictor shown in FIG. 1, when the composite valve device is placed in its flow restricting state.
Figure 4:
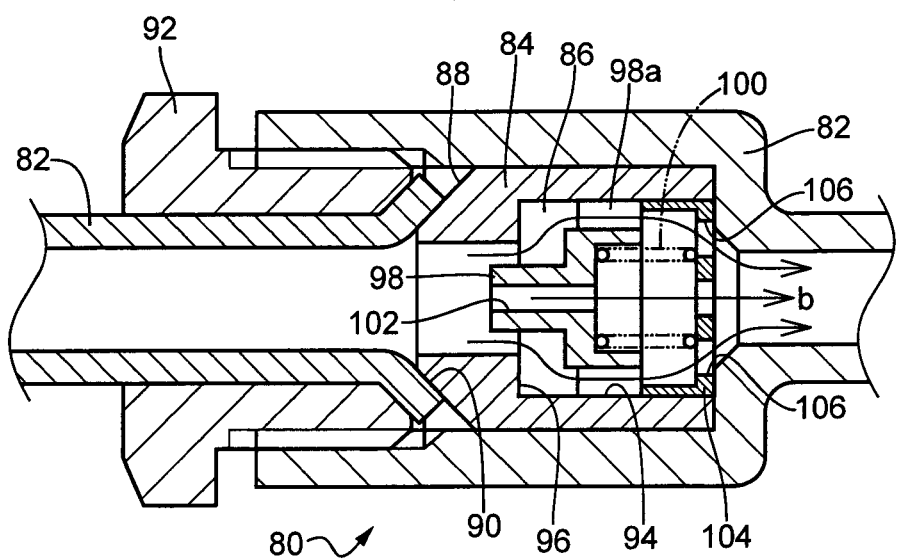
FIG. 4 is a cross sectional view showing in detail the example of the composite valve device integrally provided with the braking valve and the flow restrictor shown in FIG. 1, when the composite valve device is placed in its free-flow permitting state.

FIGS. 3 and 4 are the cross sectional views showing in detail an example of the composite valve device 80 integrally incorporating the braking valve 76 and the flow restrictor 78, which are shown in FIG. 1. As shown in FIGS. 3 and 4, the composite valve device 80 has a cylindrical valve chamber 86 partially defined by a cylindrical member 84 received in a bore of one of a pair of metallic conduits 82 which is on the side of the oil reservoir 64. The pair of metallic conduits 82 constitutes the drain oil passage 74. The above-described cylindrical member 84 is fixed in position by a pipe connector nut 92 such that a tapered surface 88 at one end of the cylindrical member 84 on the side of the flow control valve 62, that is, on the side of the clutch cylinder 40, is held in pressing contact with a tapered surface 90 at one end of the other metallic conduit 82 disposed on the side of the clutch cylinder 40. The composite valve device 80 is provided with: a cylindrical valve member 98 accommodated in the valve chamber 86 such that the valve member 98 is axially movably with a predetermined gap left with respect to an inner circumferential surface 94 of the valve chamber 86, and such that the cylindrical valve member 98 can be seated on and unseated from a first seating surface 96 formed at an end of the valve chamber 86 on the side of the clutch cylinder 40; a spring 100 for biasing the cylindrical valve member 98 toward the first seating surface 96 with a predetermined biasing force to set the above-indicated clutch releasing pressure value; and a flow restricting hole 102 which is formed so as to extend through a radially central portion of the cylindrical valve member 98 and which permits restricted flows of the working oil therethrough to and from the valve chamber 86 even when the cylindrical valve member 98 is seated on the first seating surface 96. In this composite valve device 80, the flow restricting hole 102 functions as the above-described flow restrictor 78 while the cylindrical member 84, cylindrical valve member 98 and spring 100 function as the above-described braking valve 76.

The above-described cylindrical valve member 98 has a plurality of axially extending guide portions 98a which project radially outwardly from its outer circumferential surface such that the guide portions 98a are equally spaced apart from each other in the circumferential direction of the valve member 98. In an end portion of an opening near the oil reservoir 64 in the cylindrical member 84, which is on one side of the cylindrical valve member 98 on the side of the oil reservoir 64, there is accommodated a cylindrical spring seat member 104 having a bottom portion on the side of the oil reservoir 64. The above-described spring 100 is interposed between the cylindrical valve member 98 and the spring seat member 104, with a predetermined preload acting on the spring 100. It is noted that the bottom portion of the spring seat member 104 has a plurality of through-holes 106 functioning as flow holes through which the working oil flows. As shown in FIG. 4, the spring seat member 104 functions to limit a distance of axial movement of the cylindrical valve member 98 in the direction toward the oil reservoir 64 against the preload of the spring 100, in abutting contact with the guide portions 98a of the cylindrical valve member 98.

FIG. 3 is the cross sectional view showing the composite valve device 80 when the cylindrical valve member 98 is seated on the first seating surface 96. In the state of FIG. 3, the working oil is permitted to flow to and from the valve chamber 86 through the flow restricting hole 102, in a predetermined flow restricting state, as indicated by arrows "a".

On the other hand, FIG. 4 is the cross sectional view showing the composite valve device 80 when the cylindrical valve member 98 is held in abutting contact with the end face of the sprint seat member 104 after the cylindrical valve member 98 is moved away from the first seating surface 96 against the preload of the spring 100. In the state of FIG. 4, the working oil is permitted to flow in the direction from the flow control valve 62 (shown in FIG. 1) toward the oil reservoir 64 (shown in FIG. 1) through a plurality of axially extending gaps formed between the cylindrical valve member 98 and the cylindrical member 84, as well as the flow restricting hole 102, whereby the braking valve 76 is placed in its free-flow permitting state.

Here, the highest pressure of the working oil acting on the end portion of the braking valve 76 on the side of the clutch cylinder 40 due to an inertia of the working oil existing in the oil passage between the pressure chamber 44 and the braking valve 76 while the working oil is discharged from the clutch cylinder 40 through the flow control valve 62 is referred to as "a first pressure value", and the highest pressure of the working oil acting on the end portion of the braking valve 76 on the side of the clutch cylinder 40 when the pressure in the pressure chamber 44 of the clutch cylinder 40 is reduced below the atmospheric pressure value due to acceleration of the working oil existing in the oil passage between the pressure chamber 44 and the braking valve 76, which acceleration is caused by a behavior of the vehicle, is referred to as "a second pressure value". The above-indicated clutch releasing pressure value is set to be higher than a higher one of the above-indicated first and second pressure values, by setting the preload of the spring 100, for example. The above-indicated first and second pressure values are obtained by experimentation, for example. Accordingly, the cylindrical valve member 98 is moved away from the first seating surface 96 as shown in FIG. 4 when the pressure acting on the end portion of the cylindrical valve member 98 on the side of the clutch cylinder 40 has exceeded the above-indicated clutch releasing pressure value.

The hydraulic control device 12 according to the present embodiment for the friction clutch 10 includes the braking valve 76 provided in the drain oil passage 74 through which the working oil is discharged from the clutch cylinder (hydraulic cylinder) 40 through the flow control valve 62 to place the friction clutch 10 in its engaged state. This braking valve 76 permits the working oil to be discharged from the clutch cylinder 40 to the oil reservoir 64 when the pressure acting on the end portion of the braking valve 76 on the side of the clutch cylinder 40 has exceeded the predetermined clutch releasing pressure value. Accordingly, even when the pressure in the pressure chamber 44 of the clutch cylinder 40 is reduced below the atmospheric pressure value due to the inertia of the working oil discharged from the clutch cylinder 40 or due to the acceleration of the working oil caused by the behavior of the vehicle, the discharge flow of the working oil from the pressure chamber 44 and the oil passage between the pressure chamber 44 and the braking valve 76 is restricted by the braking valve 76, making it possible to prevent an increase of the gap formed between the output-side piston 46 and the pressure-chamber-side piston 48, which increase would otherwise be caused by the reduction of the pressure in the pressure chamber 44 below the atmospheric pressure value. As a result, a rise of the pressure in the pressure chamber 44 of the clutch cylinder 40 by a supply flow of the working oil into the pressure chamber 44 to place the friction clutch 10 in its released state can be initiated at an earlier point of time, so that the response of the releasing action of the friction clutch 10 can be improved.

Further, the present embodiment is configured such that the preload of the spring 100 is set to set the above-described clutch releasing pressure value to be higher than the highest pressure value (a higher one of the first and second pressure values) acting on the end portion of the cylindrical valve member 98 of the braking valve 76 on the side of the clutch cylinder 40 when the pressure in the above-described clutch cylinder 40 is reduced below the atmospheric pressure value due to the inertia of the working oil discharged from the clutch cylinder 40 and due to the acceleration of the working oil caused by a behavior of the vehicle. Accordingly, the braking valve 76 is not opened by a force acting on the end portion of the cylindrical valve member 98 on the side of the clutch cylinder 40 as a result of generation of the above-indicated reduced pressure below the atmospheric pressure value, making it possible to prevent an increase of the gap between the output-side piston 46 and pressure-chamber-side piston 48 of the clutch cylinder 40, which increase would otherwise be caused by the generation of the above-indicated reduced pressure due to the discharging flow of the working oil from the pressure chamber 44. As a result, a rise of the pressure in the pressure chamber 44 of the clutch cylinder 40 by a supply flow of the working oil into the clutch cylinder 40 to place the friction clutch 10 in its released state can be initiated at an earlier point of time, so that the response of the releasing action of the friction clutch 10 can be improved.

The present embodiment is also configured such that the hydraulic control device 12 further includes the flow restrictor 78 disposed in parallel with the braking valve 76. Accordingly, the working oil can be discharged from the pressure chamber 44 of the clutch cylinder 40 through the flow restrictor 78, to an extent that permits a minute gap to be formed between the output-side piston 46 and pressure-chamber-side piston 48 of the clutch cylinder 40 for preventing transmission of a vibration, even when the braking valve 76 is not opened. Therefore, it is possible to prevent the transmission of a vibration of a vehicle drive power source such as the engine 16 to the sealing member 50 through the output-side and pressure-chamber-side pistons 46, 48, so that the durability of the sealing member 50 can be improved.

The present embodiment is also configured such that the hydraulic control device 12 further includes the flow control valve 62 configured to supply the working oil from the hydraulic pressure source 60 to the pressure chamber 44 of the clutch cylinder 40 for placing the friction clutch 10 in its released state, and to discharge the working oil from the pressure chamber 44 of the clutch cylinder 40 for placing the friction clutch 10 in its engaged state. Accordingly, the operation of the friction clutch 10 can be controlled by electrically controlling the flow control valve 62. Described more specifically, the flow control valve 62 is switchable between its state for permitting a flow of the working oil from the hydraulic pressure source 60 to the clutch cylinder 40 and its state for permitting a flow of the working oil from the clutch cylinder 40 to the oil reservoir 64, and is operable to continuously control the rates of flow of the working oil, according to an amount of an electric current applied to the flow control valve 62, so that the clutch operating force of the clutch cylinder 40 acting on the friction clutch 10 can be controlled to control the operation of the friction clutch 10.

The present embodiment is further configured such that the braking valve 76 is provided in the drain oil passage 74. Accordingly, the braking valve 76 does not disturb a supply flow of the working oil to the clutch cylinder 40 to place the friction clutch 10 in its released state, so that the response of the releasing action of the friction clutch 10 can be further improved. Even where there is a high possibility of a stall of the engine, for instance, upon releasing of the friction clutch 10, the stall of the engine can be prevented owing to a quick releasing action of the friction clutch 10.

The present embodiment is also configured such that the composite valve device 80 functions as the braking valve 76 and the flow restrictor 78, so that the braking valve 76 and flow restrictor 78 can be made compact in construction, and the length of the drain oil passage 74 can be shortened.

Where the vehicle is of the front-engine rear-drive (FR) type as in the present embodiment, the oil passages such as the control oil passage 52 and the drain oil passage 74 provided in the hydraulic control device 12 tend to have relatively large lengths in the longitudinal direction of the vehicle, so that the longitudinal acceleration of the vehicle tends to cause a relatively high value of longitudinal acceleration of the working oil in the pressure chamber 44 of the clutch cylinder 40 and in the oil passages communicating with the pressure chamber 44, resulting in a relatively large amount of reduction of the pressure in the pressure chamber 44 below the atmospheric pressure value due to the above-indicated longitudinal acceleration value. However, the present embodiment is configured to effectively prevent an increase of the gap formed between the output-side piston 46 and the pressure-chamber-side piston 48 even upon generation of such a relatively high value of the longitudinal acceleration.

Embodiment 2

Other embodiments of this invention will be described next. In the following embodiments, the same reference signs will be used to identify the corresponding elements in the different embodiments, which will not be described.

Figure 5:
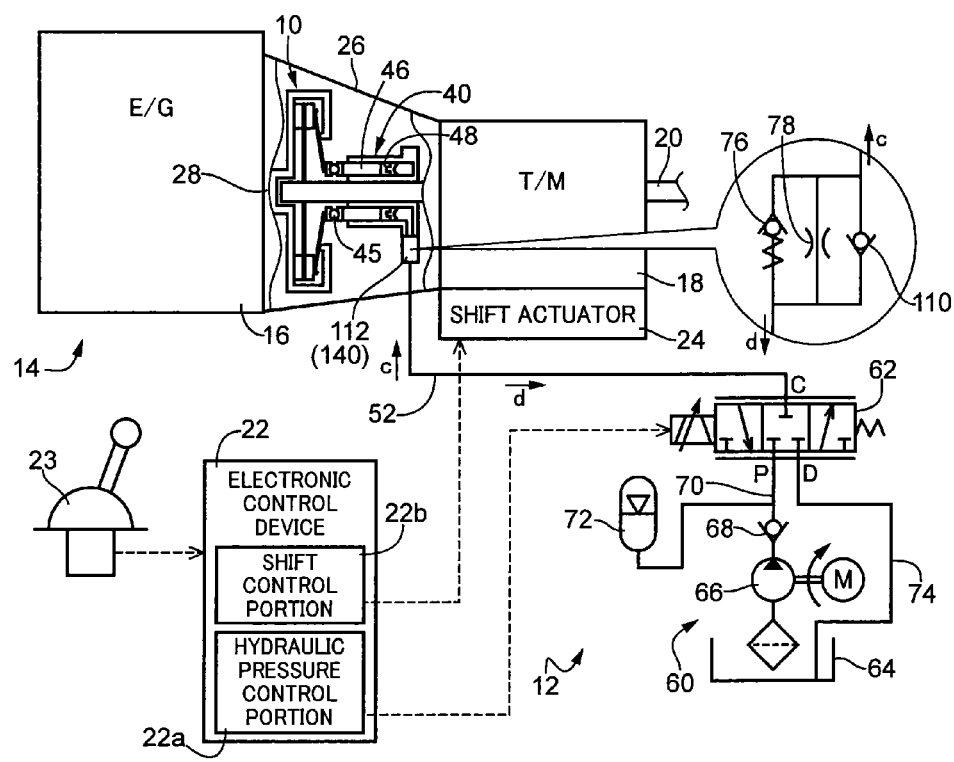
FIG. 5 is a schematic view showing a hydraulic control device according to another embodiment of the invention, and a vehicular drive system provided with the hydraulic control device.

FIG. 5 is the schematic view showing the hydraulic control device 12 according to another embodiment of the invention, and the vehicular drive system 14 provided with the hydraulic control device 12. As shown in FIG. 5, the drain oil passage 74 of the hydraulic control device 12 of this embodiment is not provided with the composite valve device 80, and the drain port D of the flow control valve 62 and the oil reservoir 64 are held in communication with each other. The control oil passage 52 in the present embodiment is provided with the braking valve 76, the flow restrictor 78 disposed in parallel with the braking valve 76, and a one-way valve 110 which is disposed in parallel with the braking valve 76 and the flow restrictor 78 and which permits a flow of the working fluid in a direction indicated by an arrow "c" in FIG. 5, from the flow control valve 62 toward the clutch cylinder 40 and inhibits a flow of the working fluid in a direction indicated by an arrow "d" in FIG. 5, from the clutch cylinder 40 toward the flow control valve 62. It will be understood that the control oil passage 52 is a passage through which the working oil is discharged from the clutch cylinder 40 to place the friction clutch 10 in its engaged state. The hydraulic control device 12 of the present embodiment is provided with a composite valve device 112 which functions as the above-described braking valve 76, flow restrictor 78 and one-way valve 110.

Figure 6:
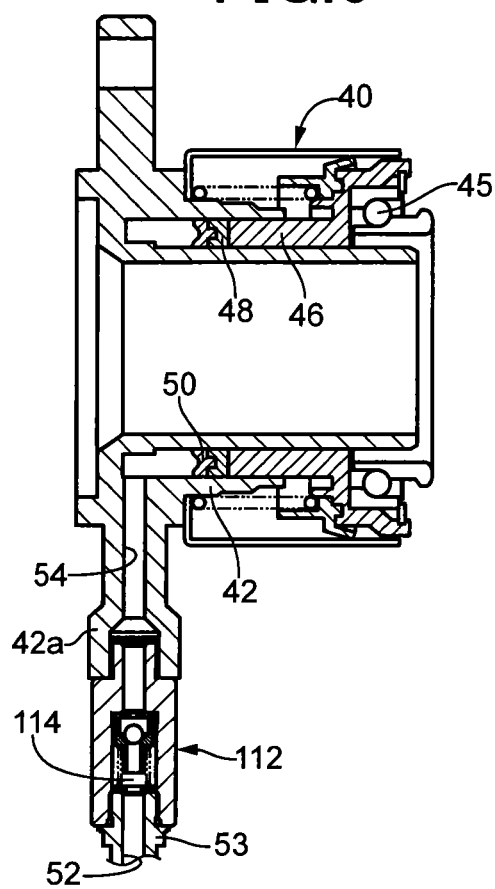
FIG. 6 is a cross sectional view showing a clutch cylinder shown in FIG. 5, a composite valve device connected to a joint portion of the clutch cylinder, and a part of a metallic conduit connected to the composite valve device.

FIG. 6 is the cross sectional view showing the clutch cylinder 40 shown in FIG. 5, the composite valve device 112 connected to the joint portion 42a of the clutch cylinder 40, and a portion of the metallic conduit 53 connected to the composite valve device 112. As shown in FIG. 6, the joint portion 42a in this embodiment extends downwardly and radially outwardly at the outer periphery portion of the pressure chamber 44. The composite valve device 112 connects the joint portion 42a and the metallic conduit 53 to each other and is provided with a cylindrical member 113 which constitutes a portion of the control oil passage 52.

Figure 7:
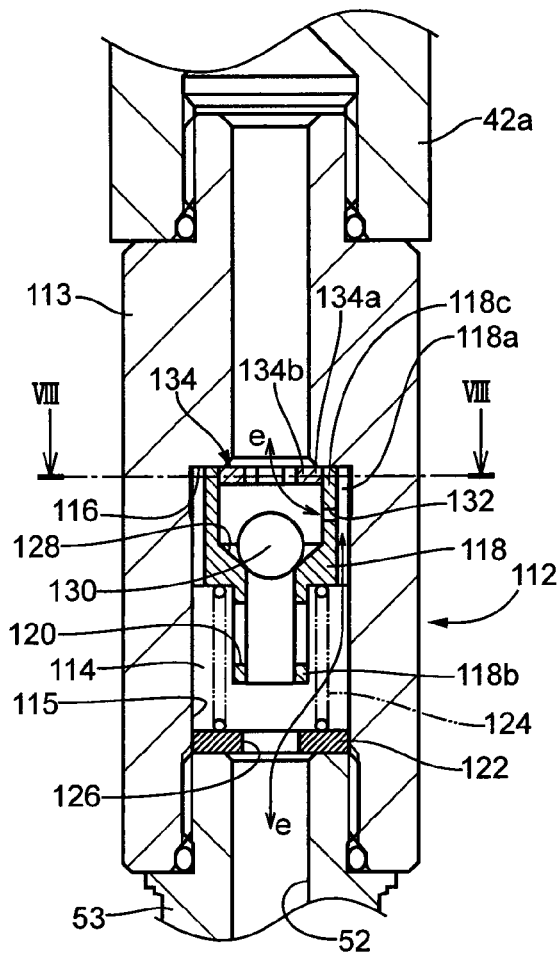
FIG. 7 is a cross sectional view showing the composite valve device shown in FIG. 6, and a part of the metallic conduit connected to one end portion of the composite valve device.
Figure 8:
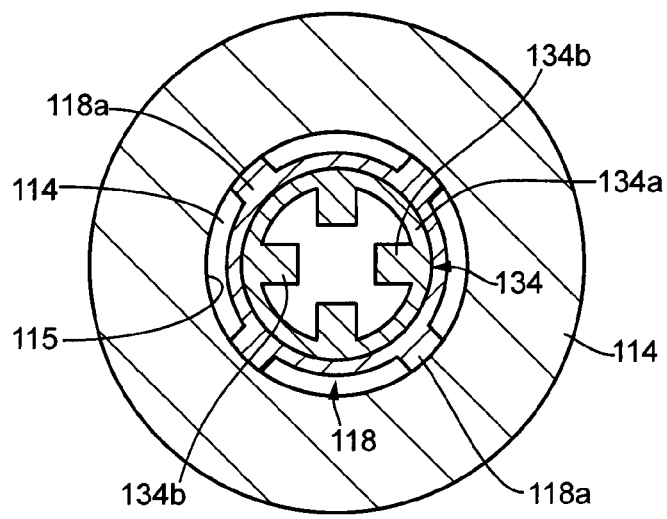
FIG. 8 is a cross sectional view taken along lines VIII-VIII of FIG. 7.

FIG. 7 is the cross sectional view showing the composite valve device 112 shown in FIG. 6, and a part of the metallic conduit 53 connected to one end portion of the composite valve device 112, and FIG. 8 is the cross sectional view taken along lines VIII-VIII of FIG. 7. As shown in FIGS. 7 and 8, the above-described composite valve device 112 is provided with a cylindrical valve member 118 accommodated in a cylindrical valve chamber 114 formed within the cylindrical member 113 such that the cylindrical valve member 118 is axially movable with a predetermined gap with respect to an inner circumferential surface 115 of the pressure chamber 114 and can be seated on and unseated from a first seating surface 116 formed at an end of the valve chamber 114 on the side of the clutch cylinder 40. This cylindrical valve member 118 has a plurality of axially extending guide portions 118a which project radially outwardly from its outer circumferential surface such that the guide portions 118a are equally spaced apart from each other in the circumferential direction of the valve member 118. The valve member 118 further has a cylindrical small-diameter portion 118b which has an outside diameter smaller than a diameter of the inner circumferential surface 115 and an inside diameter of a spring 124 and which extends in an axial direction toward the flow control valve 62, namely, toward the oil reservoir 64. The above-descried small-diameter portion 118b has a plurality of through-holes 120 formed therethrough in its radial direction as communication holes of the working oil such that the through-holes 120 are equally spaced apart from each other in the circumferential direction of the small-diameter portion 118b.

The composite valve device 112 is further provided with an annular spring seat member 122 disposed on one side of the cylindrical valve member 118 remote from the clutch cylinder 40, namely, on the side of the flow control valve 62, and a spring 124 interposed between the spring seat member 122 and the cylindrical valve member 118, for biasing the cylindrical valve member 118 with a predetermined biasing force toward the first seating surface 116, to set the above-indicted clutch releasing pressure value. The above-described annular-spring seat member 122 has a through-hole 126 formed therethrough in its axial direction as a communication hole of the working oil.

The composite valve device 112 is further provided with: a spherical small valve member 130 accommodated in the cylindrical valve member 118 such that the small valve member 130 can be seated on and unseated from a tapered second seating surface 128 formed at a position within the cylindrical valve member 118 remote from the clutch cylinder 40; and a flow restricting hole 132 which is formed through a circumferential portion 118c of the cylindrical valve member 118 and which permits restricted flows of the working oil therethrough to and from the valve chamber 114 even when the cylindrical valve member 118 is seated on the first seating surface 116 while the small valve member 130 is seated on the second seating surface 128. On one side of the small valve member 130 on the side of the clutch cylinder 40, and in an open end portion of the cylindrical valve member 118 on the side of the clutch cylinder 40, there is disposed a stopper member 134 which functions to prevent a movement of the small valve member 130 out of the cylindrical valve member 118 toward the clutch cylinder 40, by abutting contact with the small valve member 130. This stopper member 134 is formed so as not to disturb flows of the working oil through the cylindrical valve member 118 even while the stopper member 134 is in abutting contact with the small valve member 130. Described more specifically, the stopper member 118 is provided with a short cylindrical portion 134a fitted in the open end portion of the cylindrical valve member 118, and a plurality of projecting portions 134b extending radially inwardly from its inner circumferential surface of the short cylindrical portion 134a such that the projecting portions 134b are equally spaced apart from each other in the circumferential direction of the short cylindrical portion 134a. The above-described plurality of projecting portions 134b are formed such that a distance between the two projecting portions 134b opposed to each other in the rectangular direction of an axis of the cylindrical valve member 118 is smaller than a diameter of the small valve member 130. The small valve member 130 is prevented from being moved out of the cylindrical valve member 118, in abutting contact with the projecting portions 134b of the stopper member 118.

In the composite valve device 112 configured as described above, the flow restricting hole 132 functions as the above-described flow restrictor 78, and the first seating surface 116 of the cylindrical member 113, the cylindrical valve member 118 and the spring 124 cooperate to function as the above-described braking valve 76, while the second seating surface 128 of the cylindrical valve member 118 and the small valve member 130 cooperate to function as the one-way valve 110.

FIG. 7 is the cross sectional view showing the composite valve device 112 in its state wherein the cylindrical valve member 118 is seated on the first seating surface 116 while the small valve member 130 is seated on the second seating surface 128. In this state of FIG. 7, the working oil is permitted to flow to and from the valve chamber 114 through the flow restricting hole 132 in a predetermined flow restricting state, as indicated by arrows "e" in the figure.

Figure 9:
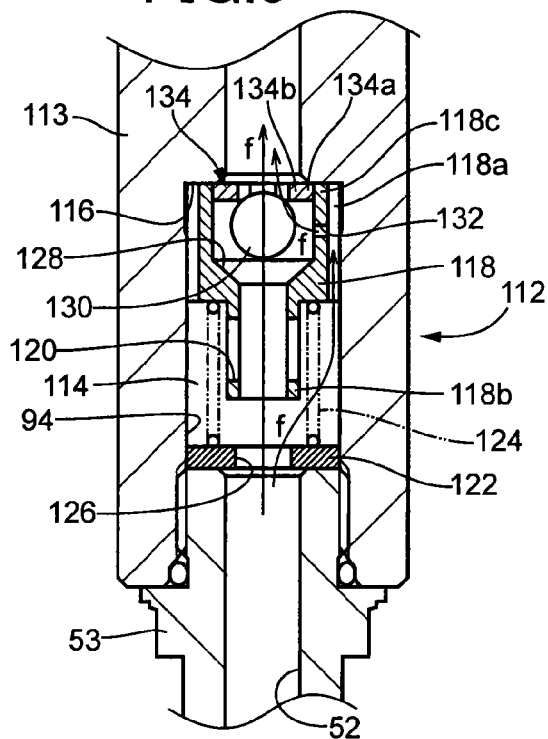
FIG. 9 is a cross sectional view showing the composite valve device shown in FIG. 7, in its state wherein a cylindrical valve member is seated on a first seating surface while a small valve member is spaced apart from a second seating surface and held in abutting contact with projecting portions of a stopper member.

On the other hand, FIG. 9 is the cross sectional view showing the composite valve device 112 in its state wherein the cylindrical valve member 118 is seated on the first seating surface 116 while the small valve member 130 is spaced apart from the second seating surface 128 and held in abutting contact with the projecting portions 134b of the stopper member 134. In this state of FIG. 9, the working oil is permitted to flow in the direction from the flow control valve 63 (shown in FIG. 5) toward the clutch cylinder 40 (shown in FIG. 5) through a plurality of gaps formed between the small valve member 130 and the projecting portions 134b of the stopper member 134, as well as through the flow restricting hole 132, as indicated by arrows "f" in the figure, whereby the one-way valve 110 is placed in its free-flow permitting state.

Figure 10:
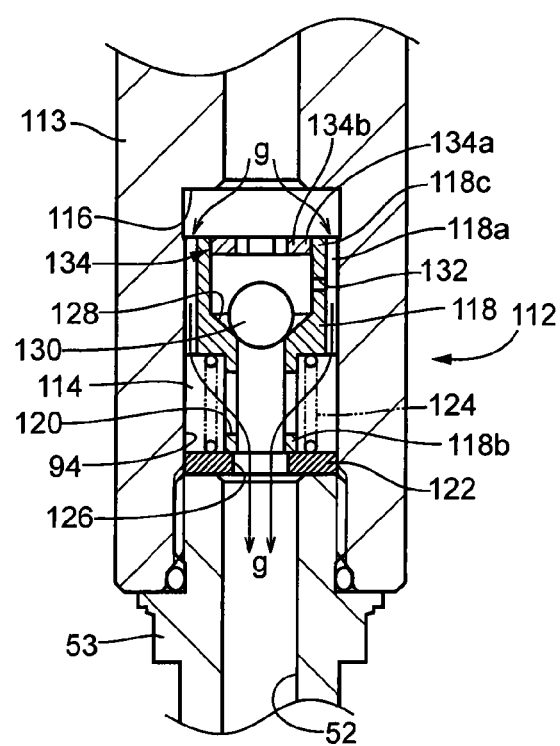
FIG. 10 is a cross sectional view showing the composite valve device shown in FIG. 7, in its state wherein the small valve member is seated on the second seating surface while the cylindrical valve member is spaced apart from the first seating surface and held at its small-diameter portion in abutting contact with a spring seat member.

FIG. 10 is the cross sectional view showing the composite valve device 112 in its state wherein the small valve member 130 is seated on the second seating surface 128 while the cylindrical valve member 118 is spaced apart from the first seating surface 116 against the preload of the spring 130 and held at its small-diameter portion 118b in abutting contact with the spring seat member 122. In this state of FIG. 10, the working oil is permitted to flow in the direction from the clutch cylinder 40 (shown in FIG. 5) toward the flow control valve 62 (shown in FIG. 5) through a plurality of axially extending gaps formed between the cylindrical valve member 118, the cylindrical member 113 and the through hole 126, as well as the flow restricting hole 132, as indicated by an arrow "g" in the figure, whereby the braking valve 76 is placed in its free-flow permitting state.

The composite valve device 112 of the present embodiment is also configured to permit the discharge flow of the working oil from the pressure chamber 44 of the clutch cylinder 40 when a pressure of the working oil between the pressure chamber 44 and the braking valve 76 has exceeded the predetermined clutch releasing pressure value. This clutch releasing pressure value is set to be higher than a higher one of the above-indicated first and second pressure values, by setting the preload of the spring 124, for example. Accordingly, the cylindrical valve member 118 is moved away from the first seating surface 116 as shown in FIG. 10 when the pressure acting on the end portions of the cylindrical valve member 118 and the stopper member 134 on the side of the clutch cylinder 40 has exceeded the above-indicated clutch releasing pressure value.

The hydraulic control device 12 according to the present embodiment for the friction clutch 10 is identical in construction with that of the first embodiment, except for the aspects described above, and includes the braking valve 76 provided in the control oil passage 52 functioning as the drain oil passage through which the working oil is discharged from the clutch cylinder 40 to place the friction clutch 10 in its engaged state. This braking valve 76 permits the working oil to be discharged from the clutch cylinder 40 toward the oil reservoir 64 when the pressure acting on the end portion of the braking valve 76 on the side of the clutch cylinder 40 has exceeded the predetermined clutch releasing pressure value. Accordingly, even when the pressure in the pressure chamber 44 of the clutch cylinder 40 is reduced below the atmospheric pressure value, it is possible to prevent an increase of the gap formed between the output-side piston 46 and the pressure-chamber-side piston 48, which increase would otherwise be caused by the reduction of the pressure in the pressure chamber 44 below the atmospheric pressure value. As a result, a rise of the pressure in the pressure chamber 44 can be initiated upon initiation of a supply flow of the working oil into the pressure chamber 44 to place the friction clutch 10 in its released state, so that the response of the releasing action of the friction clutch 10 can be improved.

The present embodiment is further configured such that the braking valve 76 is provided in the control oil passage 52 connecting the flow control valve 62 and the clutch cylinder 40, and such that the hydraulic control device 12 further includes the one-way valve 110 which is provided in the control passage 52, in parallel with the braking valve 76 and the flow restrictor 78 and which permits a flow of the working oil in the direction from the flow control valve 62 toward the clutch cylinder 40. Accordingly, the braking valve 76 is located at a position nearer to the clutch cylinder 40, so that it is possible to more effectively reduce the degree of reduction of the pressure in the pressure chamber 44 of the clutch cylinder 40 below the atmospheric pressure value, and accordingly prevent disturbance of a supply flow of the working oil into the clutch cylinder 40 to place the friction clutch 10 in its released state, while assuring an advantage of preventing an increase of the gap formed between the output-side piston 46 and the pressure-chamber-side piston 48 of the clutch cylinder 40, which increase would otherwise be caused by the reduction of the pressure in the pressure chamber 44 below the atmospheric pressure value. Thus, the response of the releasing action of the friction clutch 10 can be further improved. Even where there is a high possibility of a stall of the engine, for instance, upon releasing of the friction clutch 10, the stall of the engine can be prevented owing to a quick releasing action of the friction clutch 10.

The present embodiment is further configured such that the composite valve device 112 functions as the braking valve 76, flow restrictor 78 and one-way valve 110, so that the braking valve 76, flow restrictor 78 and one-way valve 110 can be made small-sized, and the length of the control oil passage 52 provided with these element can be shortened.

Embodiment 3

Figure 11:
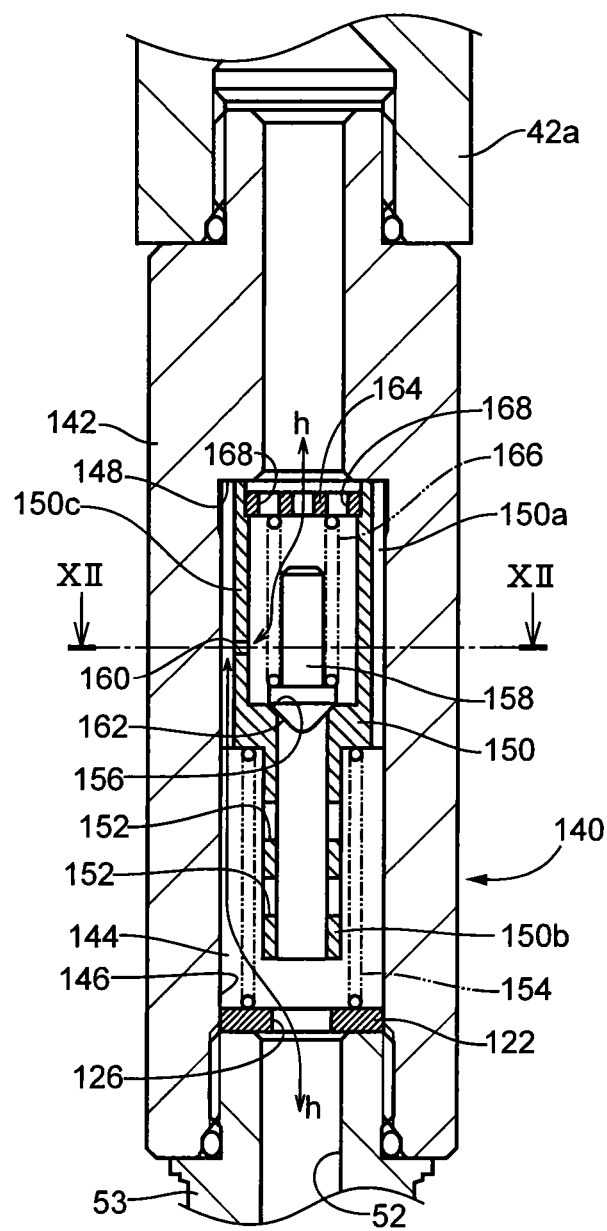
FIG. 11 is a cross sectional view corresponding to that of FIG. 7 of the second embodiment, showing a composite valve device in a further embodiment of the invention, and a part of a metallic conduit connected to one end portion of the composite valve device.
Figure 12:
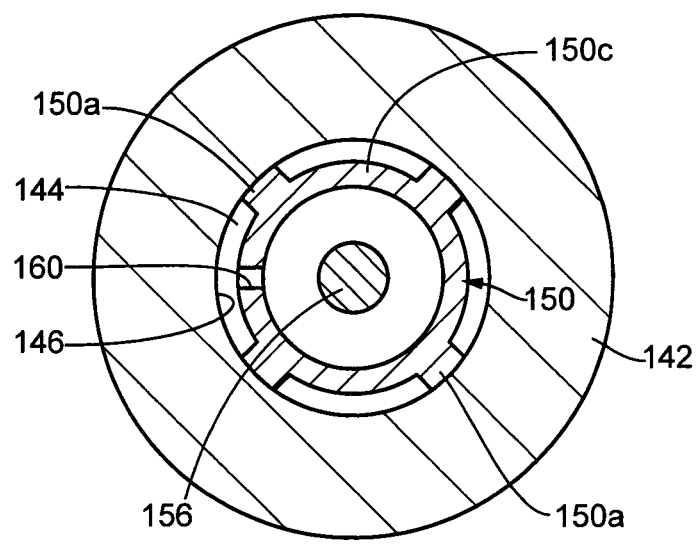
FIG. 12 is a cross sectional view taken along line XII-XII of FIG. 11.

FIG. 11 is the cross sectional view corresponding to that of FIG. 7 of the preceding second embodiment, showing a composite valve device 140 in a further embodiment of the invention, and parts of a joint portion 42a of the cylinder housing 42 and a metallic conduit 53 connected to opposite end portions of the composite valve device 140, and FIG. 12 is the cross sectional view taken along line XII-XII of FIG. 11. As shown in FIGS. 11 and 12, the composite valve device 140 is provided with a cylindrical member 142 which constitutes a portion of the control oil passage 52 connecting the joint portion 42a and the metallic conduit 53 to each other.

The composite valve device 140 is further provided with a cylindrical valve member 150 which is accommodated in a cylindrical valve chamber 144 formed in the cylindrical member 142, such that the cylindrical valve member 150 is movable in an axial direction with a predetermined gap left with respect to a n inner circumferential surface 146 of the valve chamber 144, and such that the cylindrical valve member 150 can be seated on and unseated from a first seating surface 148 formed at an end of the valve chamber 144 on the side of the clutch cylinder 40. The cylindrical valve member 150 in the present embodiment is identical with the cylindrical valve member 118 in the second embodiment, except in that axial dimensions of guide portions 150a, small-diameter portion 150b and circumferential portion 150c of the cylindrical valve member 150 are longer than those of the corresponding portions of the cylindrical valve member 118, and in that the cylindrical valve member 150 has a plurality of through-holes 152 which functions as communication holes of the working oil and which are formed so as to extend through the small-diameter portion 150b in its radial direction, at two axial positions of the small-diameter portion 150b, such that the through-holes are equally spaced apart from each other in the circumferential direction of the small-diameter portion 150b.

The composite valve device 140 is further provided with a spring 154 which is interposed between the spring seat member 122 and the cylindrical valve member 150 and which biases the cylindrical valve member 150 toward the first seating surface 148 with a predetermined biasing force, to set the above-described clutch releasing pressure value; a stepped cylindrical small valve member 158 accommodated in the cylindrical valve member 150 such that the small valve member 158 can be seated on and unseated from a tapered second seating surface 156 formed at a position within the cylindrical valve member 150 remote from the clutch cylinder 40; and a flow restricting hole 160 which is formed through a circumferential portion 150c of the cylindrical valve member 150 and which permits restricted flows of the working oil therethrough to and from the valve chamber 144 even when the cylindrical valve member 150 is seated on the first seating surface 148 while the small valve member 158 is seated on the second seating surface 156.

The above-described small valve member 158 is the stepped cylindrical member so-called a "poppet valve" having a smaller diameter on the side of the clutch cylinder 40, and has a tapered abutment surface 162 provided at its end remote from the clutch cylinder 40, in opposition to the second seating surface 156. On one side of the small valve member 158 nearer to the clutch cylinder 40 and in an open end portion of the cylindrical valve member 150 on the side of the clutch cylinder 40, there is fixedly disposed a disc-like spring seat member 164, on the side of the flow control valve 62. The composite valve device 140 is further provided with a spring 166 which is interposed between the spring seat member 164 and a shoulder-surface of the small valve member 158 and which is given a predetermined preload, for biasing the small valve member 158 toward the second seating surface 156 with a predetermined biasing force. The above-described spring seat member 164 is formed so as to prevent a movement of the small valve member 158 out of the cylindrical valve member 150 toward the clutch cylinder 40, by abutting contact with the small valve member 158, which is moved toward the clutch cylinder 40 against the preload of the spring 166 and so as not to disturb flows of the working oil through the cylindrical valve member 150 while the spring seat member 164 is in abutting contact with the small valve member 158. Described more specifically, the spring seat member 164 is provided with a plurality of through-holes 168 formed therethrough in a direction parallel to its axis, to function as communication holes of the working oil.

In the composite valve device 140 constructed as described above, the flow restricting hole 160 functions as the above-described flow restrictor 78, and the first seating surface 148 of the cylindrical member 142, the cylindrical valve member 150 and the spring 154 cooperate to function as the above-described braking valve 76, while the second seating surface 156 of the cylindrical valve member 150, the small valve member 158 and the spring 166 cooperate to function as the one-way valve 110. In the present embodiment, the preload given to the spring 166 is set to be smaller than that given to the spring 154, so that the clutch releasing pressure value of the one-way valve 110 is lower than that of the braking valve 76.

FIG. 11 is the cross sectional view showing the composite valve device 140 in its state wherein the cylindrical valve member 150 is seated on the first seating surface 148 while the small valve member 158 is seated on the second seating surface 156. In this state of FIG. 11, the working oil is permitted to flow through the through-hole 160 to and from the valve chamber 144 in a predetermined flow restricting state, as indicated by arrows "h" in the figure.

Figure 13:
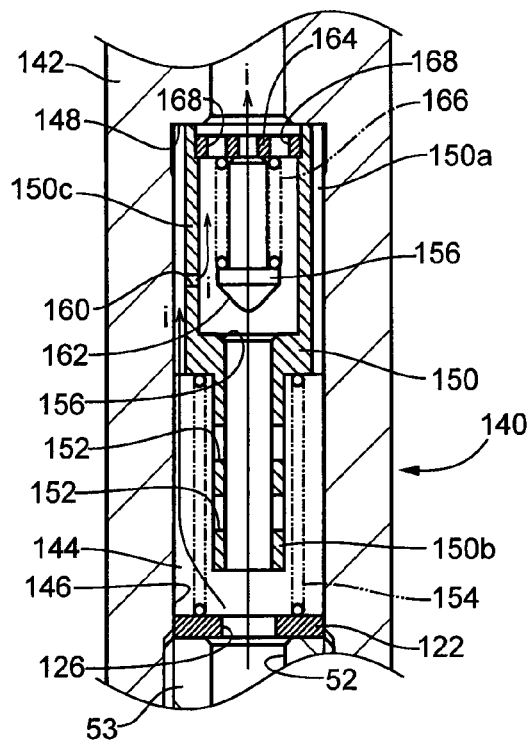
FIG. 13 is a cross sectional view showing the composite valve device shown in FIG. 11, in its state wherein a cylindrical valve member is seated on a first seating surface while a small valve member is spaced apart from a second seating surface and held in abutting contact with a spring seat member.

On the other hand, FIG. 13 is the cross sectional view showing the composite valve device 140 in its state wherein the cylindrical valve member 150 is seated on the first seating surface 148 while the small valve member 158 is spaced apart from the second seating surface 156 against the preload of the spring 166 and held in abutting contact with the spring seat member 164. In this state of FIG. 13, the working oil is permitted to flow through the through-holes 168 of the spring seat member 164 as well as through the flow restricting hole 160, in the direction from the flow control valve 62 (shown in FIG. 5) toward the clutch cylinder 40 (shown in FIG. 5), as indicated by arrows "i" in the figure, whereby the one-way valve 110 is placed in its free-flow permitting state.

Figure 14:
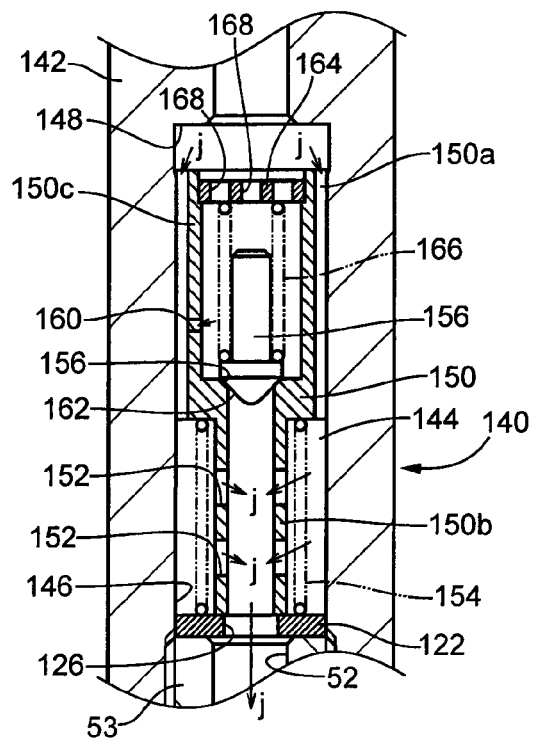
FIG. 14 is a cross sectional view showing the composite valve device shown in FIG. 11, in its state wherein the small valve member is seated on the second seating surface while the cylindrical valve member is spaced apart from the first seating surface and held at its small-diameter portion in abutting contact with a spring seat member.

FIG. 14 is the cross sectional view showing the composite valve device 140 in its state wherein the small valve member 158 is seated on the second seating surface 156 while the cylindrical valve member 150 is spaced apart from the first seating surface 148 against the preload of the spring 154 and the small diameter portion 150b of the valve member 150 is held in abutting contact with the spring seat member 122. In this state of FIG. 14, the working oil is permitted to flow in the direction from the clutch cylinder 40 (shown in FIG. 5) toward the flow control valve 62 (shown in FIG. 5) through a plurality of axially extending gaps formed between the cylindrical valve member 150 and the cylindrical member 142, and the plurality of through-holes 152, as well as through the flow restricting hole 160, as indicated by arrows "j" in the figure, whereby the braking valve 76 is placed in its free-flow permitting state.

The composite valve device 140 of the present embodiment is also configured to permit the discharge flow of the working oil from the pressure chamber 44 of the clutch cylinder 40 when the pressure of the working oil between the pressure chamber 44 and the braking valve 76 has exceeded the predetermined clutch releasing pressure value. This clutch releasing pressure value of the braking valve 76 is set to be higher than a higher one of the above-indicated first and second pressure values, by setting the preload of the spring 154, for example. Accordingly, the cylindrical valve member 150 is moved away from the first seating surface 148 as shown in FIG. 14 when the pressure acting on the end portions of the cylindrical valve member 150 and the spring seat member 164 on the side of the clutch cylinder 40 has exceeded the above-indicated clutch releasing pressure value.

The hydraulic control device 12 according to the present embodiment for the friction clutch 10 is identical in construction except above-explained structure with that of the preceding second embodiment, so that it is possible to prevent an increase of the gap formed between the output-side piston 46 and the pressure-chamber-side piston 48 of the clutch cylinder 40, which increase would otherwise be caused by the reduction of the pressure in the pressure chamber 44 of the clutch cylinder 40 below the atmospheric pressure value, as in the first and second embodiments. As a result, the response of the releasing action of the friction clutch 10 can be improved.

The present embodiment is further configured such that the composite valve device 140 is provided with the spring 166 biasing the small valve member 158 toward the second seating surface 156 of the cylindrical valve member 150 with the predetermined biasing force, so that the one-way valve 110 is operable with a higher degree of stability than the small valve member 130 in the second embodiment, for example, which is configured to be seated by gravity on the second seating surface 128, and so that the composite valve device 140 can be more easily installed. For example, it is possible to prevent an unstable operation of the one-way valve 110 due to a movement of the small valve member 158 by a vibration. Further, the composite valve device 140 can be installed such that the small valve member 158 is located below the second seating surface 156, for example, owing to the biasing force of the spring 166 acting on the small valve member 158, which biasing force is set to be larger than the gravity of the small valve member 158.

While the embodiments of this invention have been described in detail by reference to the drawings, it is to be understood that the present invention is not limited to the illustrated embodiments, but may be otherwise embodied.

In the illustrated embodiments, for example, the transmission 18 is a step-variable transmission having a power transmission mechanism of the parallel-axes permanent meshing type, and is a manual transmission shifted by an operation of the shift commanding device 23 by the vehicle operator. However, the transmission 18 may be replaced by an automatic transmission shifted under the control of the electronic control device 22 on the basis of a running speed of the vehicle and a drive-force-related value and according to a stored relationship, for instance, or a continuously variable transmission such as a CVT, for instance.

While the vehicle is of the front-engine rear-drive (FR) type in the illustrated embodiment, the vehicle may be of a front-engine front-drive (FF) type, a rear-engine rear-drive (RR) type or any other type. Further, the present invention is equally applicable to a vehicle other than the two drive-wheels type vehicle, such as a four drive-wheels type vehicle.

In the illustrated embodiments, the vehicular drive system 14 is provided with the friction clutch 10, the transmission 18, and the propeller shaft and differential gear device (not shown), which are disposed in this order of description as viewed from the side of the engine 16. However, the friction clutch 10, the above-described propeller shaft, the transmission 18 and the above-described differential gear device are disposed in this order of description as viewed from the side of the engine 16, so that the working oil pressurized by the oil pump 66 disposed in the transmission 18 located in a rear portion of the vehicle is supplied from the oil pump 66 to the clutch cylinder 40 provided for the friction clutch 10 located in a front portion of the vehicle, through the control oil passage 52 extending from the oil pump 66 to the clutch cylinder 40. In this case wherein the control oil passage 52 has a relatively large length in the longitudinal direction of the vehicle, the inertia of the working oil in the control oil passage 52 while the working oil is discharged from the clutch cylinder 40, and the acceleration of the working oil in the control oil passage 52 due to the longitudinal acceleration of the vehicle tend to be comparatively large or high, so that the degree of reduction of the pressure in the pressure chamber 44 of the clutch cylinder 40 below the atmospheric pressure value tends to be comparatively large. However, the present invention prevents an increase of the gap formed between the output-side piston 46 and the pressure-chamber-side piston 48 of the clutch cylinder 40, which increase would otherwise be caused by the above-described comparatively large degree of reduction of the pressure in the pressure chamber 44 below the atmospheric pressure value. In other words, the effect of the present invention to prevent the increase of the above-indicated gap increases with an increase of the degree of reduction of the pressure in the pressure chamber 44 below the atmospheric pressure value.

In the illustrated embodiments, the composite valve device 112, 140 is provided with the flow restricting hole 132, 160 and functions as the flow restrictor 78. However, the flow restricting hole 132, 160 is not essential, and the composite valve device 112, 140 need not function as the flow restrictor 78.

In the illustrated embodiments, the clutch releasing pressure value is set to be higher than the higher one of the above-indicated first and second pressure values. However, this setting of the clutch releasing pressure value is not essential. For instance, the clutch releasing pressure value may be set to be higher than the first pressure value or the second pressure value, or to be lower than the first and second pressure values. In these cases, too, the present invention provides its effect to some extent.

In the composite valve device 140 in the illustrated third embodiment, the abutment surface 162 of the small valve member 158 is located above the second seating surface 156. However, this location is not essential. For example, the abutment surface 162 may be located below the second seating surface 156.

Figure 15:
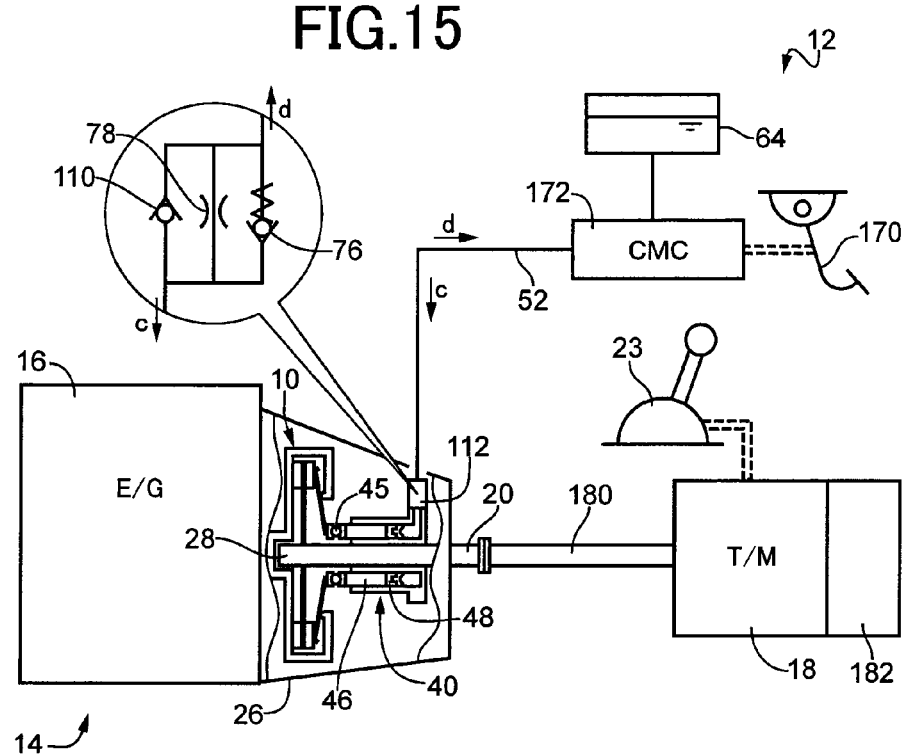
FIG. 15 is a schematic view showing a hydraulic control device according to a still further embodiment of this invention, and a vehicular drive system provided with the hydraulic control device.

Although the transmission 18 in the illustrated embodiments is shifted by the shift actuator 24 operated according to an operation of the shift commanding device 23, the transmission 18 may be shifted according to the operation of the shift commanding device 23 mechanically connected to the transmission 18, as shown in FIG. 15.

In the illustrated embodiments, the hydraulic control device 12 has the hydraulic pressure source 60 having the electrically operated oil pump 66, so that the working oil is supplied from the hydraulic pressure source 60 to the clutch cylinder 40 through the electrically controlled flow control valve 62. However, the hydraulic control device 12 may be provided with a hydraulic pressure source in the form of a clutch master cylinder 172 well known in the art, which has a piston moved to pressurize the working oil according to an amount of operation of a clutch pedal 170 by the vehicle operator, as shown in FIG. 15, so that the thus pressurized working oil is supplied from the clutch master cylinder 172 to the clutch cylinder 40.

In the illustrated embodiments, the clutch cylinder 40 is provided with the output-side piston 46, pressure-chamber-side piston 48 and sealing member 50 which are arranged in the order of description on one side of the diaphragm spring 32. However, this arrangement of the clutch cylinder 40 is not essential. For instance, the pressure-chamber-side piston 48 may be eliminated, where the sealing member 50 is configured to also function as the pressure-chamber-side piston 48. Further, the pressure-chamber-side piston 48 and the sealing member 50 may be integrally formed. The clutch cylinder 40 may have various other modified configurations, such as a configuration in which the output-side piston 46, the pressure-chamber-side piston 48 and the sealing member 50 are integrally formed.

While the clutch cylinder 40 in the illustrated embodiments is configured such that the minute gap is formed between the output-side piston 46 and the pressure-chamber-side piston 48, for preventing transmission of a vibration, a minute gap may be formed between the pressure-chamber-side piston 48 and the sealing member 50. In essence, the above-indicated minute gap may be formed between the diaphragm spring 32 and the sealing member 50.

It is to be understood that the foregoing embodiments have been described for illustrative purpose only, and that the present invention may be embodied with various other changes and improvements which may occur to those skilled in the art, without departing from the spirit of this invention.

NOMENCLATURE OF REFERENCE SIGNS

- 10: Vehicular friction clutch
- 12: Hydraulic control device
- 40: Clutch cylinder (Hydraulic cylinder)
- 46: Output-side piston (piston)
- 48: Pressure-chamber-side piston
- 52: Control oil passage (through which working oil flows from hydraulic cylinder)
- 60: Hydraulic pressure source
- 62: Flow control valve
- 74: Drain oil passage (through which working oil flows from hydraulic cylinder)
- 76: Braking valve
- 78: Flow restrictor
- 110: One-way valve
- 112, 140: Composite valve device
- 114, 144: Valve chamber
- 115, 146: Inner circumferential surface
- 116, 148: First seating surface
- 118, 150: Cylindrical valve member
- 118c, 150c: Circumferential portion
- 124, 154: Spring
- 128, 156: Second seating surface
- 130, 158: Small valve member
- 132, 160: Flow restricting hole
- O: Axis

The invention claimed is:

1. A hydraulic control device for a friction clutch for a vehicle, which is operated by a hydraulic cylinder having pistons arranged in an axial direction thereof, comprising:

a braking valve provided in an oil passage through which a working oil is discharged from said hydraulic cylinder to place said friction clutch in its engaged state, the braking valve permitting the working oil to be discharged from said hydraulic cylinder when a pressure acting on an end portion of said braking valve on the side of said hydraulic cylinder has exceeded a predetermined clutch releasing pressure value;

a flow control valve configured to supply the working oil from a hydraulic pressure source to said hydraulic cylinder for placing said friction clutch in its released state, and to discharge the working oil from said hydraulic cylinder for placing said friction clutch in its engaged state;

said braking valve being provided in a control oil passage connecting said flow control valve and said hydraulic cylinder;

a one-way valve which is provided in said control passage, in parallel with said braking valve and which permits a flow of the working oil in a direction from said flow control valve toward said hydraulic cylinder and inhibits a flow of the working oil in a direction from said hydraulic cylinder toward said flow control valve; and a flow restrictor disposed in parallel with said braking valve, wherein said braking valve, said one-way valve, and said flow restrictor are provided in a composite valve device, and wherein said composite valve device is provided with:

a cylindrical valve member which is accommodated in a cylindrical valve chamber provided in said control passage, such that the cylindrical valve member is movable in an axial direction with a predetermined gap left with respect to an inner surface of said valve chamber, and such that the cylindrical valve member can be seated on and unseated from a first seating surface formed at an end of said valve chamber on the side of said hydraulic cylinder;

a spring which biases said cylindrical valve member in a direction toward said first seating surface with a predetermined biasing force, to set said clutch releasing pressure value;

a small valve member which has a diameter smaller than a maximum inside diameter of the cylindrical valve member and which is accommodated in said cylindrical valve member such that the small valve member can be seated on and unseated from a second seating surface formed at a position within said cylindrical valve member remote from said hydraulic cylinder; and a flow restricting hole which is formed, as said flow restrictor, through a circumferential wall of said cylindrical valve member and which permits restricted flows of the working oil therethrough to and from said cylindrical valve chamber even when said cylindrical valve member is seated on said first seating surface while said small valve member is seated on said second seating surface.

2. The hydraulic control device for the friction clutch for the vehicle, according to claim 1, wherein said clutch releasing pressure value is higher than said pressure acting on the end portion of said braking valve on the side of said hydraulic cylinder when the pressure in said hydraulic cylinder is reduced below an atmospheric pressure value due to an inertia of the working oil discharged from said hydraulic cylinder or due to acceleration of the working oil caused by a behavior of said vehicle.

3. The hydraulic control device for the friction clutch for the vehicle, according to claim 1, wherein the composite valve device is further provided with a spring seat member disposed at an end of said valve chamber on the side of said flow control valve, said spring being disposed between said spring seat member and said cylindrical valve member, and said spring seat member including a through-hole formed therethrough in an axial direction.

4. The hydraulic control device for the friction clutch for the vehicle, according to claim 1, wherein the composite valve device is further provided with a stopper member which is disposed in an open end portion of said cylindrical valve member on the side of said hydraulic cylinder, said stopper member preventing a movement of said small valve member out of said cylindrical valve member toward said hydraulic cylinder by abutting contact with said small valve cylinder.

5. The hydraulic control device for the friction clutch for the vehicle, according to claim 4, wherein said stopper member is provided with a cylindrical portion fitted in said open end portion of said cylindrical valve member, and a plurality of projecting portions extending radially inwardly from an inner circumferential surface of said cylindrical portion.

* * * * *